(12) United States Patent
Tsuchida et al.

(10) Patent No.: US 11,894,721 B2
(45) Date of Patent: Feb. 6, 2024

(54) STATOR, ELECTRIC MOTOR, VACUUM CLEANER, AND HAND DRYING DEVICE

(71) Applicant: Mitsubishi Electric Corporation, Tokyo (JP)

(72) Inventors: Kazuchika Tsuchida, Tokyo (JP); Sachiko Kawasaki, Tokyo (JP); Mitsumasa Hamazaki, Saitama (JP); Takayuki Onihashi, Tokyo (JP); Yutaka Nomiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 230 days.

(21) Appl. No.: 16/976,500

(22) PCT Filed: Mar. 26, 2018

(86) PCT No.: PCT/JP2018/011994
§ 371 (c)(1),
(2) Date: Aug. 28, 2020

(87) PCT Pub. No.: WO2019/186615
PCT Pub. Date: Oct. 3, 2019

(65) Prior Publication Data
US 2021/0050753 A1 Feb. 18, 2021

(51) Int. Cl.
*H02K 1/16* (2006.01)
*H02K 11/215* (2016.01)
(Continued)

(52) U.S. Cl.
CPC .............. *H02K 1/165* (2013.01); *H02K 3/12* (2013.01); *H02K 3/28* (2013.01); *H02K 3/48* (2013.01); *H02K 11/215* (2016.01)

(58) Field of Classification Search
CPC ........... H02K 1/165; H02K 3/12; H02K 3/28; H02K 3/48
(Continued)

(56) References Cited

U.S. PATENT DOCUMENTS 3,826,960 A * 7/1974 Broadway .............. H02K 17/10
318/776
3,986,086 A * 10/1976 Muller ................... H02K 29/08
318/400.14
(Continued)

FOREIGN PATENT DOCUMENTS

CN 111801877 A 10/2020
DE 20 2016 104 039 U1 12/2016
(Continued)

OTHER PUBLICATIONS

Office Action dated Jun. 22, 2021 issued in the corresponding JP application No. 2020-510170 ( and English translation).
(Continued)

*Primary Examiner* — Alexander Talpalatski
(74) *Attorney, Agent, or Firm* — POSZ LAW GROUP, PLC

(57) ABSTRACT

A stator includes four split cores arranged in the circumferential direction. Each split core includes a yoke including a pair of joint parts, and a tooth. The shape of an end of the tooth is asymmetrical. An angle θ1 (degrees) formed by a side surface of the tooth and a side surface of the yoke on the inner side in the radial direction of the stator satisfies 90 degrees<θ1<180 degrees.

15 Claims, 13 Drawing Sheets

(51) Int. Cl.
    *H02K 3/12*         (2006.01)
    *H02K 3/28*         (2006.01)
    *H02K 3/48*         (2006.01)

(58) Field of Classification Search
    USPC ........................................................ 310/179
    See application file for complete search history.

(56) References Cited

U.S. PATENT DOCUMENTS

| | | | | |
|---|---|---|---|---|
| 4,021,879 | A * | 5/1977 | Brigham | A47L 9/2857 96/397 |
| 4,295,233 | A * | 10/1981 | Hinkel | A47K 10/48 4/619 |
| 4,361,790 | A * | 11/1982 | Laesser | H02K 1/14 968/491 |
| 5,567,127 | A * | 10/1996 | Wentz | F04D 29/663 417/423.9 |
| 6,787,958 | B1 * | 9/2004 | Walter | H02K 1/246 310/216.023 |
| 6,844,653 | B2 * | 1/2005 | Kolomeitsev | H02K 1/148 310/216.082 |
| 9,484,774 | B2 * | 11/2016 | Omura | H02K 1/146 |
| 10,574,098 | B2 * | 2/2020 | Lam | H02K 5/207 |
| 10,720,800 | B2 * | 7/2020 | Kobayashi | H02K 29/03 |
| 2002/0135255 | A1 * | 9/2002 | Willliams | F04D 25/08 310/216.075 |
| 2004/0189136 | A1 * | 9/2004 | Kolomeitsev | H02K 3/345 310/216.082 |
| 2007/0252487 | A1 * | 11/2007 | Fujii | H02K 1/146 310/68 B |
| 2012/0256514 | A1 * | 10/2012 | Junak | H02K 1/146 310/216.092 |
| 2015/0200576 | A1 * | 7/2015 | Kinashi | H02K 11/215 310/71 |
| 2016/0344244 | A1 * | 11/2016 | Li | H02K 29/03 |
| 2016/0344271 | A1 * | 11/2016 | Li | H02K 1/146 |
| 2017/0054352 | A1 | 2/2017 | Li et al. | |
| 2019/0036423 | A1 | 1/2019 | Oketani et al. | |
| 2020/0403487 | A1 * | 12/2020 | Tsuchida | H02K 11/215 |

FOREIGN PATENT DOCUMENTS

| | | |
|---|---|---|
| EP | 3 760 877 A1 | 1/2021 |
| EP | 3 760 878 A1 | 1/2021 |
| EP | 3 761 488 A1 | 1/2021 |
| JP | 2013-153471 A | 5/2003 |
| JP | 2004-336997 A | 11/2004 |
| JP | 2005-117844 A | 4/2005 |
| JP | 2008-167598 A | 7/2008 |
| JP | 2008-278603 A | 11/2008 |
| JP | 2009-050116 A | 3/2009 |
| JP | 2010-93945 A | 4/2010 |
| JP | 2016-116417 A | 6/2016 |
| JP | 2017-135766 A | 8/2017 |
| WO | 2017/175387 A1 | 10/2017 |

OTHER PUBLICATIONS

Extended European Search Report dated Feb. 15, 2021, issued in corresponding European Patent Application 18911634.6.
International Search Report of the International Searching Authority dated Jun. 26, 2018 for the corresponding international application No. PCT/JP2018/011994 (and English translation).
Office Action dated Aug. 30, 2022 in connection with counterpart Chinese Patent Application No. 201880091508.3 (and English machine translation).
Office Action dated Mar. 23, 2023 in connection with counterpart European Patent Application No. 18911634.6.

* cited by examiner

STATOR, ELECTRIC MOTOR, VACUUM CLEANER, AND HAND DRYING DEVICE

CROSS REFERENCE TO RELATED APPLICATION

This application is a U.S. national stage application of International Patent Application No. PCT/JP2018/011994 filed on Mar. 26, 2018, the disclosure of which is incorporated herein by reference.

TECHNICAL FIELD

The present invention relates to a stator of an electric motor.

BACKGROUND

To facilitate winding of a winding on a stator of an electric motor, a stator core formed by a plurality of split cores is generally used. When winding of the windings on the stator is facilitated, the density of a stator coil or coils can be increased, and the motor efficiency thus improves. In an electric motor disclosed in, for example, patent reference 1, a stator core is divided into 12 core constituent bodies, and the electric motor therefore includes 12 teeth.

PATENT REFERENCE

Patent Reference 1: Japanese Patent Application Publication No. 2005-117844

Normally, however, the larger the number of magnetic poles of an electric motor and the number of teeth of a stator, the higher the electrical frequency of a current input to the electric motor. This roughens the waveform of the current input to the electric motor, and thus degrades the controllability (for example, the control of rotation of a rotor) of the electric motor. Under the circumstances, to enhance the controllability of the electric motor in rotation at a speed as high as, for example, 10,000 rpm or more, it is desired to use as few magnetic poles and as few teeth as possible. A demand has, therefore, arisen for an electric motor that uses a small number of magnetic poles and a small number of teeth, and includes split cores facilitating winding of a winding on a stator.

SUMMARY

It is an object of the present invention to provide a stator having high controllability and facilitating winding of a winding on the stator.

A stator according to the present invention is provided as a stator disposed outside a rotor of an electric motor, the stator including four split cores arranged in a circumferential direction about a rotation axis of the rotor, the split cores each including a tooth, and a yoke including a pair of joint parts each having a length from the tooth toward an outer side in a radial direction of the stator, wherein in a plane perpendicular to the rotation axis of the rotor, a shape of an end of the tooth in the radial direction is asymmetrical, and an angle θ1 (degrees) formed by a side surface of the tooth and a side surface of the yoke on an inner side in the radial direction of the stator satisfies 90 degrees<θ1<180 degrees.

The present invention can provide a stator having high controllability and facilitating winding of a winding on the stator.

DETAILED DESCRIPTION

Embodiment 1

Each drawing illustrates a structure of an electric motor 1 and structures of components of the electric motor 1 in a plane perpendicular to a rotation axis Ax of a rotor 3.

Figure 1:
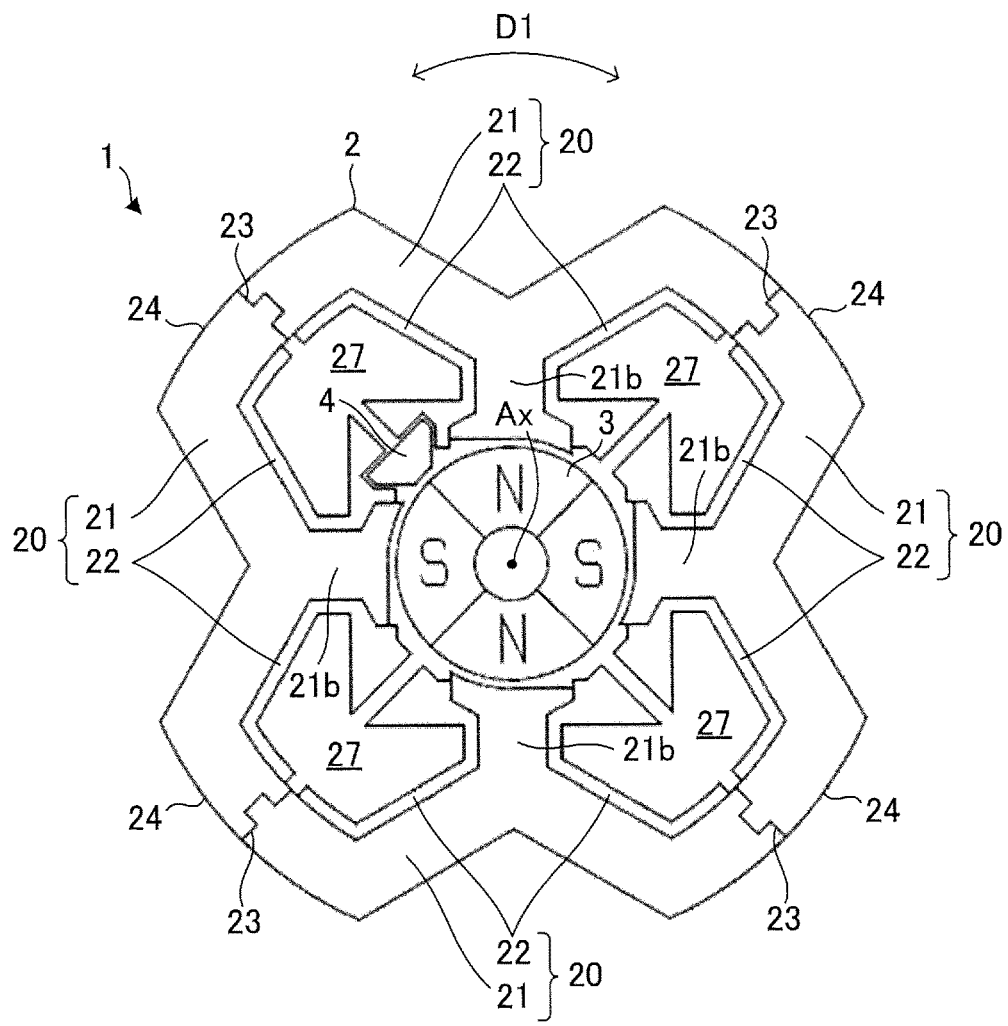
FIG. 1 is a plan view schematically illustrating a structure of an electric motor according to Embodiment 1 of the present invention.

FIG. 1 is a plan view schematically illustrating a structure of the electric motor 1 according to Embodiment 1 of the present invention. An arrow D1 indicates the circumferential directions of a stator 2 and stator cores 21 about the rotation axis Ax of the rotor 3. The arrow D1 also indicates the circumferential direction of the rotor 3 about the rotation axis Ax of the rotor 3. The direction indicated by the arrow D1 will also be simply referred to as the "circumferential direction" hereinafter. Referring to FIG. 1, insulators 22 are illustrated in the shape of a cross-section in a plane perpendicular to the rotation axis Ax of the rotor 3.

Figure 2:
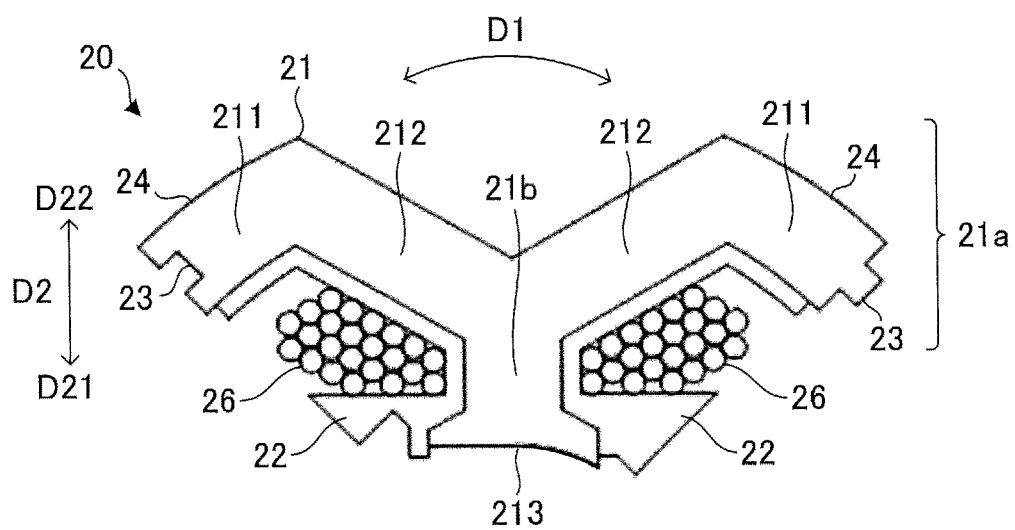
FIG. 2 is a plan view schematically illustrating a structure of a split core.

FIG. 2 is a plan view schematically illustrating a structure of a split core 20. Referring to FIG. 2, the insulator 22 and a winding 26 are illustrated in the shape of a cross-section perpendicular to the rotation axis Ax of the rotor 3. In other drawings as well, the insulator 22 and the winding 26 are illustrated in the shape of a cross-section perpendicular to the rotation axis Ax of the rotor 3. An arrow D2 indicates the radial directions of the stator 2, the stator cores 21, and the rotor 3 (to be also simply referred to as the "radial direction" hereinafter). An arrow D21 indicates the "inner side in the radial direction," and an arrow D22 indicates the "outer side in the radial direction."

Figure 3:
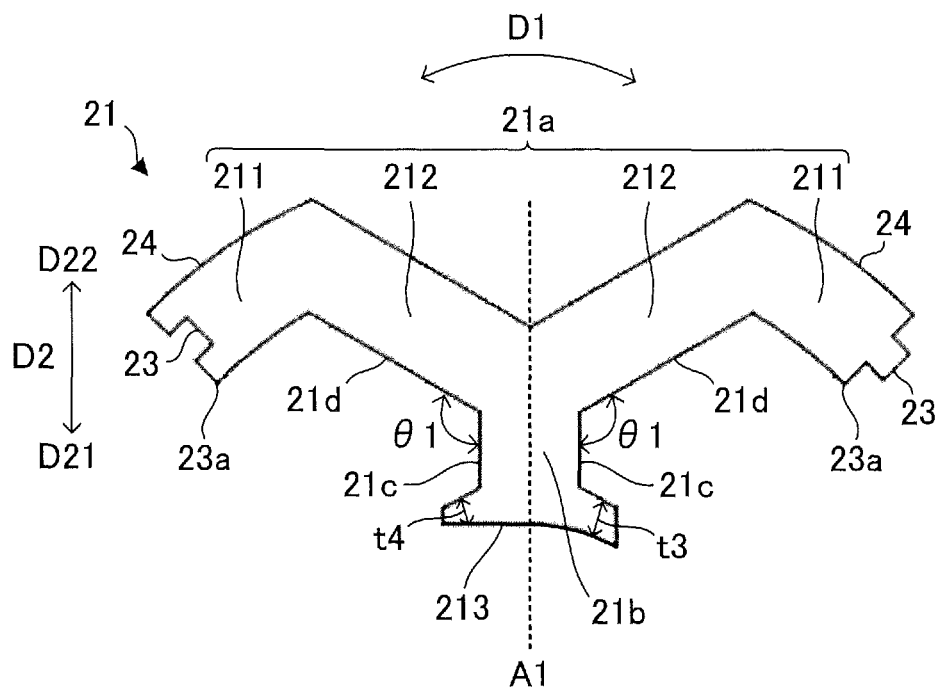
FIG. 3 is a plan view schematically illustrating a structure of a stator core.

FIG. 3 is a plan view schematically illustrating a structure of the stator core 21.

Figure 4:
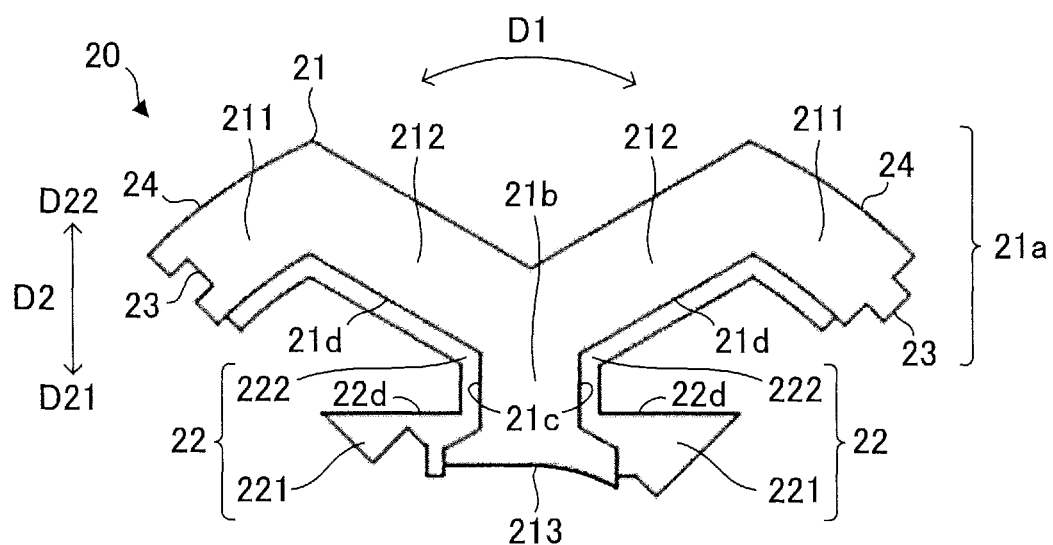
FIG. 4 is a plan view schematically illustrating the structure of the split core.
Figure 5:
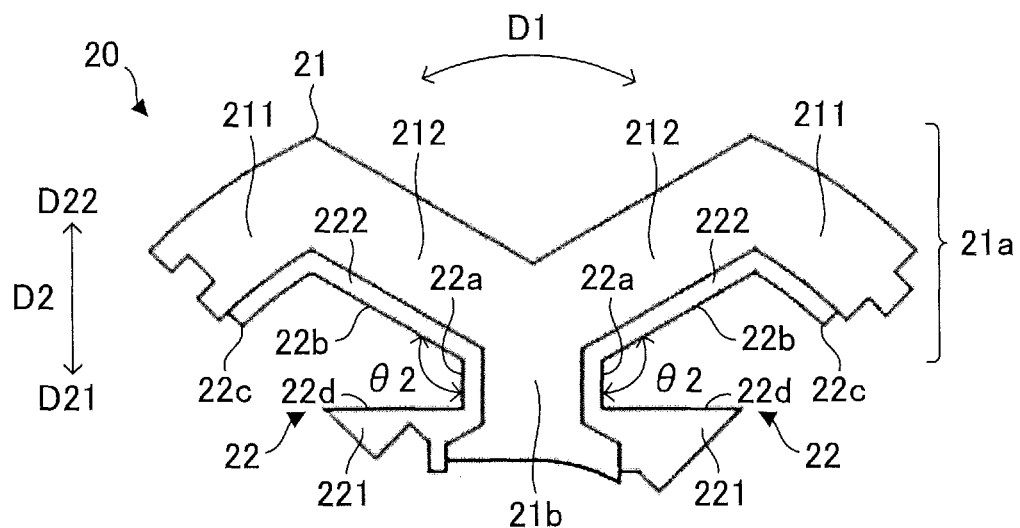
FIG. 5 is a plan view schematically illustrating the structure of the split core.
Figure 6:
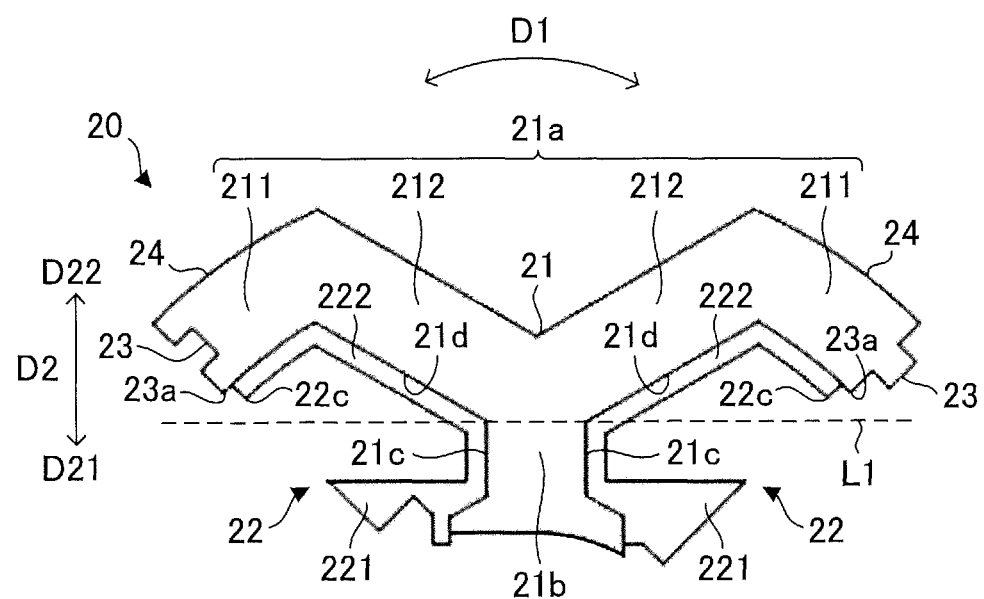
FIG. 6 is a plan view schematically illustrating the structure of the split core.

FIGS. 4 to 6 are plan views schematically illustrating the structure of the split core 20.

The electric motor 1 includes the stator 2 and the rotor 3. The electric motor 1 is designed as, for example, a permanent magnet synchronous motor.

The electric motor 1 is driven by, for example, a single-phase inverter. When the electric motor 1 is driven by a single-phase inverter, the number of switching operations can be reduced, and the switching loss in high-speed rotation can be reduced, compared, for example, to driving by a three-phase inverter. In high-speed rotation, since the electrical frequency becomes high and the number of switching operations increase, the advantage of using a single-phase inverter is obtained especially in high-speed rotation.

When the number of switching operations in the inverter is small, the waveform of a current input to the electric motor 1 is distorted, and the iron loss in the stator 2 is increased by the harmonic components of the current. Therefore, in place of electrical steel sheets, materials such as amorphous metals are desirably used as the materials of the stator cores 21 of the stator 2. This makes it possible to reduce the occurrence of iron losses in the stator 2 to keep down degradation in motor efficiency.

The stator 2 includes at least one stator core 21, at least one insulator 22, a plurality of split faces 23, a position sensor 4, and at least one winding 26. The stator 2 is disposed outside the rotor 3 through an air gap. The rotor 3 is disposed inside the stator 2 through the air gap. The insulators 22 insulate the stator cores 21. The windings 26 are wound on the stator cores 21 and, more specifically, around teeth 21b through the insulators 22. Accordingly, at least one winding 26 is wound around the insulator 22. The windings 26 are wound around the teeth 21b by, for example, concentrated winding.

The stator 2 (more specifically, the plurality of stator cores 21) includes a plurality of yokes 21a and a plurality of teeth 21b. The stator cores 21 are formed of, for example, a plurality of amorphous metals or a plurality of electrical steel sheets that are laminated.

The insulators 22 are disposed in slots 27 implemented as regions each formed between two teeth 21b adjacent to each other. More specifically, the insulators 22 are fixed to the side surfaces of the stator cores 21. The insulators 22 are made of, for example, an insulating resin.

Outer peripheral surfaces 24 of the stator cores 21 are formed in arc shapes. More specifically, the outer peripheral surfaces 24 are the outer peripheral surfaces of the yokes 21a formed outermost in the radial direction.

The rotor 3 includes a plurality of permanent magnets and form a plurality of magnetic poles. In this Embodiment, the rotor 3 has four magnetic poles.

The position sensor 4 includes, for example, a Hall element to detect a magnetic field emanating from the rotor 3. Hence, the position sensor 4 can detect a magnetic field emanating from the rotor 3. The position sensor 4 is disposed adjacent to the teeth 21b in the circumferential direction. More specifically, the position sensor 4 is fixed by at least one insulator 22 between two teeth 21b adjacent to each other. The position sensor 4 is mounted in, for example, a recess formed in the insulator 22. This makes it possible to downsize the electric motor 1. The position sensor 4 may even be fixed by two insulators 22 adjacent to each other.

Control of the electric motor 1 can be facilitated by using the position sensor 4 to detect a magnetic field emanating from the rotor 3, and further detecting the rotation position (more specifically, the phase) of the rotor 3. Moreover, since the position sensor 4 is fixed between the two teeth 21b, it is possible to prevent the electric motor 1 from getting larger and to downsize the electric motor 1.

The structure of the split cores 20 will be described below.

The stator 2 includes a plurality of split cores 20 arranged in the circumferential direction, as illustrated in FIG. 1. In this Embodiment, the stator 2 is formed by four split cores 20 arranged in the circumferential direction.

The stator 2 is divided into parts equal in number to the teeth 21b. In other words, the stator 2 is divided into four split cores 20. Accordingly, the stator 2 includes four yokes 21a and four teeth 21b.

Each split core 20 includes the stator core 21 and the insulator 22. Each stator core 21 includes one yoke 21a, one tooth 21b extending in the radial direction from the yoke 21a, and two split faces 23. Each split face 23 is formed at an end of the yoke 21a of each stator core 21 in the circumferential direction. Split end portions 23a illustrated in FIG. 3 are the inner ends of the respective split faces 23 in the radial direction.

In each split core 20, the insulator 22 is mounted on the stator core 21, and at least one winding 26 is wound around the insulator 22. Accordingly, the insulator 22 and at least one winding 26 also serve as components of the split core 20.

The yoke 21a includes at least one pair of back yokes 211 and at least one pair of joint parts 212. Each joint part 212 has a length from the tooth 21b toward the outer side in the radial direction, and each back yoke 211 has a length from the corresponding joint part 212 toward the inner side in the radial direction. More specifically, each back yoke 211 extends in the circumferential direction. The tooth 21b extends inwards in the radial direction from the yoke 21a.

In a plane perpendicular to the rotation axis Ax of the rotor 3, the tooth 21b and the pair of joint parts 212 form a Y shape. This makes it possible to reduce the material of the stator core 21. Furthermore, since the surface area of the stator core 21, more specifically, the surface area of the yoke 21a can be increased, heat generated by the electric motor 1 can be efficiently dissipated outside the electric motor 1. Each joint part 212 and the corresponding back yoke 211 may even be formed in a straight line. In this case, in the plane perpendicular to the rotation axis Ax of the rotor 3, the yoke 21a and the tooth 21b form a Y shape as a whole. The yoke 21a may even include no back yokes 211, and may include only the pair of joint parts 212. In this case as well, in the plane perpendicular to the rotation axis Ax of the rotor 3, the yoke 21a and the tooth 21b form a Y shape as a whole.

The angle θ1 (degrees) formed by each side surface 21c of the tooth 21b and a corresponding side surface 21d of the yoke 21a on the inner side in the radial direction satisfies 90 degrees<θ1<180 degrees, as illustrated in FIG. 3. The side surfaces 21d of the yoke 21a also serve more specifically as the side surfaces of the joint parts 212. In other words, the angle θ1 (degrees) formed by each side surface 21c of the tooth 21b and the side surface 21d of the corresponding joint part 212 on the inner side in the radial direction satisfies 90 degrees<θ1<180 degrees. The side surfaces 21c of the tooth 21b are surfaces extending in the radial direction, that is, surfaces on the both sides of the tooth 21b in a direction perpendicular to the radial direction. The side surfaces 21d of the yoke 21a are adjacent to the side surfaces 21c of the tooth 21b.

When the angle θ1 (degrees) satisfies 90 degrees<θ1<180 degrees, winding of the winding 26 around the tooth 21b can be facilitated. As a result, the electric motor 1 can be miniaturized, and the density of the winding 26 can be increased.

In a plane perpendicular to the rotation axis Ax of the rotor 3, the shape of an end 213 of the tooth 21b in the radial direction (more specifically, on the inner side in the radial direction) is asymmetrical. With this structure, when the rotor 3 has four magnetic poles, that is, when the number of magnetic poles on the rotor 3 is equal to the number of teeth 21b, the magnetic pole center of the rotor 3 is located on the right with respect to a straight line A1 illustrated in FIG. 3 (that is, on the downstream side in the direction in which the rotor 3 rotates) while the rotor 3 is stopped, due to the differences in size of the air gap between the stator 2 and the rotor 3. Hence, supplying a magnetic field from the stator 2 to the rotor 3 in starting the electric motor 1 makes it possible to set the direction in which the rotor 3 rotates to one direction (more specifically, from the upstream side to the downstream side). If the shape of the end 213 of the tooth 21b is symmetrical in the circumferential direction, and the air gap is uniform in the circumferential direction, the magnetic pole center of the rotor 3 is located on the straight line A1 while the rotor 3 is stopped. In this case, the rotor 3 may rotate in the reverse direction when a magnetic field is supplied from the stator 2 to the rotor 3.

In the example illustrated in FIG. 3, in a plane perpendicular to the rotation axis Ax of the rotor 3, the shape of the end 213 differs between the left and right sides of the end 213 with respect to the straight line A1 passing through the center of the stator core 21. In other words, the shape of the end 213 differs between the upstream and downstream sides in the direction in which the rotor 3 rotates. In the example illustrated in FIG. 3, the upstream side in the direction in which the rotor 3 rotates corresponds to the left side with respect to the straight line A1, and the downstream side in this direction corresponds to the right side with respect to the straight line A1.

The end 213 on the upstream side in the direction in which the rotor 3 rotates extends linearly. The end 213 on the downstream side in the direction in which the rotor 3 rotates is curved in an arc shape along the outer peripheral surface of the rotor 3. Accordingly, the air gap between the stator 2 and the rotor 3 on the upstream side in the direction in which the rotor 3 rotates is larger than that on the downstream side in this direction. In other words, the gap between the stator 2 and the rotor 3 is larger on one side (that is, the upstream side) in the circumferential direction than on the other side (that is, the downstream side) in this direction.

The thickness t3 of the end portion of the tooth 21b on the downstream side is larger than the thickness t4 of the end portion of the tooth 21b on the upstream side. The end portion of the tooth 21b extends in the circumferential direction. The thickness t3 is the thickness, in the radial direction, of the end portion of the tooth 21b on the downstream end. The thickness t4 is the thickness, in the radial direction, of the end portion of the tooth 21b on the upstream end. Normally, in each tooth of a stator, magnetic flux from a rotor flows in a concentrated manner on the downstream side of this tooth where an air gap is small. In this case, the magnetic flux density increases at an end of the downstream side of the end portion of the tooth, and the iron loss increases at the end of the downstream side. On the other hand, in the example illustrated in FIG. 3, since the thickness t3 of the end portion of the tooth 21b on the downstream side is larger than the thickness t4 of the end portion of the tooth 21b on the upstream side, an increase in magnetic flux density on the downstream side of the end portion of the tooth 21b can be kept down and an increase in iron loss can be kept down.

The shape of the end 213, however, is not limited to this Embodiment as long as the shape of the end 213 is asymmetrical.

The insulator 22 includes a pair of first portions 221 and a pair of second portions 222, as illustrated in FIG. 4. The pair of first portions 221 may be separated from each other, or integrated with each other. The pair of second portions 222 may also be separated from each other, or integrated with each other.

The first portions 221 are disposed on both sides of the tooth 21b in a plane perpendicular to the rotation axis Ax of the rotor 3, as illustrated in FIG. 4. In other words, the first portions 221 face the side surfaces 21c of the tooth 21b. The first portions 221 extend in a direction perpendicular to the radial direction in the plane perpendicular to the rotation axis Ax of the rotor 3. The first portions 221 include side surfaces 22d. The side surfaces 22d extend in the direction perpendicular to the radial direction in the plane perpendicular to the rotation axis Ax of the rotor 3.

The second portions 222 face the tooth 21b and the joint parts 212. More specifically, the second portions 222 face the side surfaces 21d of the yoke 21a and the side surfaces 21c of the tooth 21b. The second portions 222 insulate the side surfaces 21d of the yoke 21a and the side surfaces 21c of the tooth 21b. Therefore, the insulator 22 insulates the yoke 21a and the tooth 21b. The second portions 222 may face the back yokes 211.

The angle θ2 (degrees) formed by each side surface 22a of the insulator 22 fixed to the tooth 21b and a corresponding side surface 22b of the insulator 22 fixed to the yoke 21a satisfies 90 degrees<θ2<180 degrees, as illustrated in FIG. 5. The side surfaces 22b are adjacent to the side surfaces 22a.

When the angle θ2 (degrees) satisfies 90 degrees<θ2<180 degrees, winding of the winding 26 around the tooth 21b can be facilitated. As a result, the electric motor 1 can be miniaturized, and the density of the winding 26 can be increased.

The split end portions 23a are located outside a straight line L1 in the radial direction, as illustrated in FIG. 6. The straight line L1 serves as the boundary between the yoke 21a and the tooth 21b. In other words, the straight line L1 serves as the boundary between each of the side surfaces 21d of the yoke 21a and each of the side surfaces 21c of the tooth 21b.

Similarly, end portions 22c that are the ends of the insulator 22 in the circumferential direction are located outside the straight line L1 in the radial direction. This makes it possible to obtain an advantage that winding of the winding 26 is facilitated and to increase the density of a stator coil.

Figure 7:
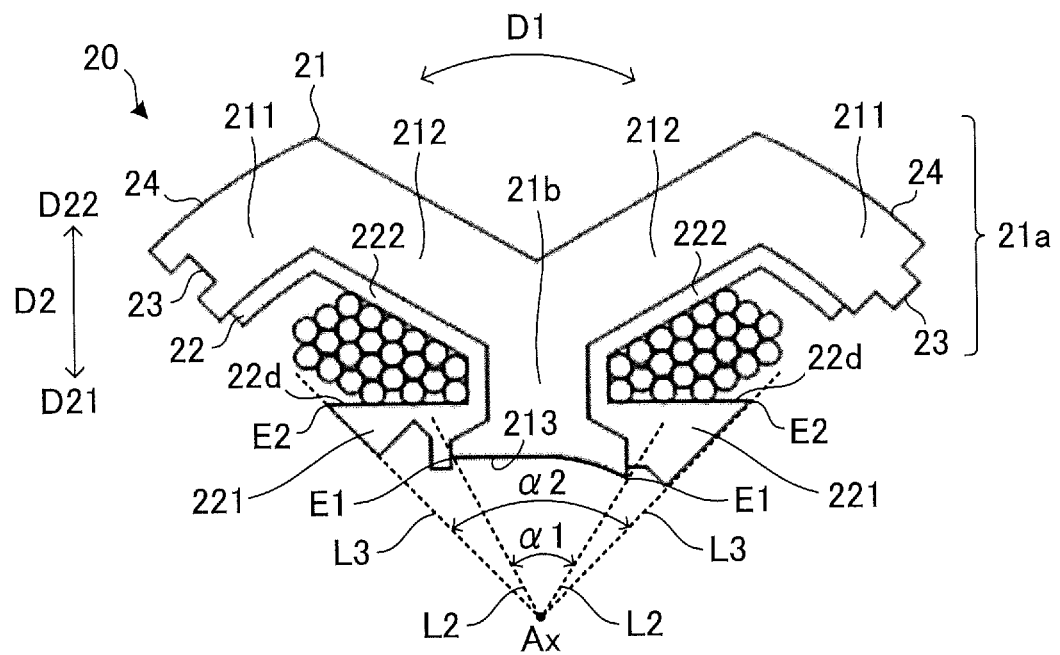
FIG. 7 is a diagram illustrating a relationship between the shape of the end of a tooth and the shape of an insulator.

FIG. 7 is a diagram illustrating a relationship between the shape of the end 213 of the tooth 21b and the shape of the insulator 22 (more specifically, the first portions 221).

An angle α1 represents the angle formed by two straight lines L2 passing through the rotation axis Ax and both ends E1 of the end 213 of the tooth 21b in a direction perpendicular to the radial direction in a plane perpendicular to the rotation axis Ax of the rotor 3. An angle α2 represents the angle formed by two straight lines L3 passing through the rotation axis Ax and both ends E2 of the pair of first portions 221 in the direction perpendicular to the radial direction in the plane perpendicular to the rotation axis Ax of the rotor 3. In this case, the relationship between the angles α1 and α2 is given by α2>α1. The ends E2 are the ends of the side surfaces 22d in the direction perpendicular to the radial direction, in the plane perpendicular to the rotation axis Ax of the rotor 3.

When the stator 2 satisfies α2>α1, the insulator 22 (more specifically, the first portions 221) extends in a direction perpendicular to the radial direction. More specifically, the insulator 22 (more specifically, the first portions 221) can be formed to be longer in the direction perpendicular to the radial direction than the end 213 of the tooth 21b. In other words, the insulator 22 (more specifically, the first portions 221) can be formed so that the side surfaces 22d of the first portions 221 are longer than the end 213 of the tooth 21b in the direction perpendicular to the radial direction. This makes it possible to wind the winding 26 around the insulator 22 with a larger number of turns and to support the winding 26 by the side surfaces 22d.

Figure 8:
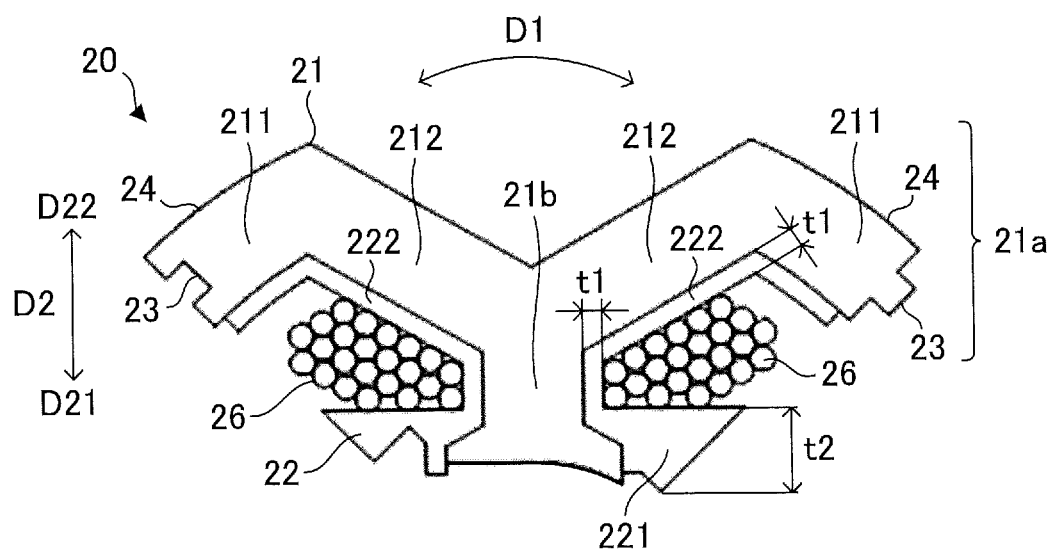
FIG. 8 is a diagram illustrating a relationship between the thickness of a first portion of the insulator and the thickness of a second portion of the insulator.
Figure 9:
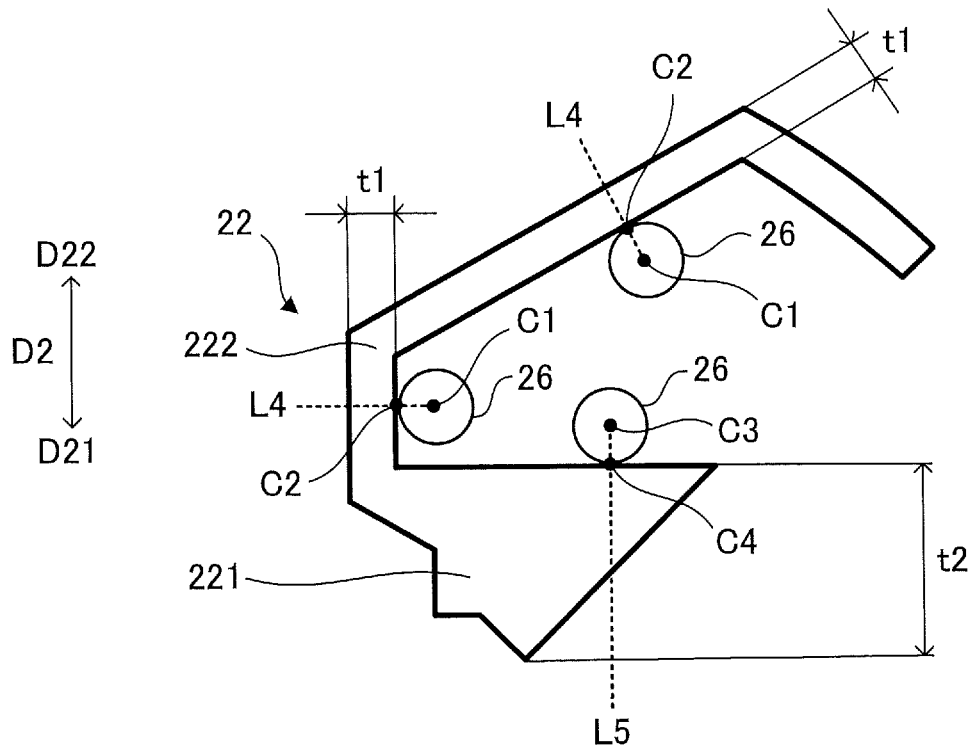
FIG. 9 is a diagram illustrating a relationship between the thickness of the first portion of the insulator and the thickness of the second portion of the insulator.

FIGS. 8 and 9 are diagrams each illustrating a relationship between the thickness of the first portion 221 of the insulator 22 and the thickness of the second portion 222 of the insulator 22.

The thickness t2 of the first portion 221 of the insulator 22 is the maximum thickness of the first portion 221 in the direction along a straight line L5, in a plane perpendicular to the rotation axis Ax of the rotor 3, as illustrated in FIG. 9. The straight line L5 is a straight line passing through a contact point C4 and a center C3 of the winding 26, in the plane perpendicular to the rotation axis Ax of the rotor 3, as illustrated in FIG. 9. The center C3 of the winding 26 is the center of the winding 26 abutting against the first portion 221, in the plane perpendicular to the rotation axis Ax of the rotor 3. The contact point C4 is the contact point between the first portion 221 and the winding 26 abutting against the first portion 221, in the plane perpendicular to the rotation axis Ax of the rotor 3.

The thickness t1 of the second portion 222 of the insulator 22 is the minimum thickness of the second portion 222 in the direction along a straight line L4, in a plane perpendicular to the rotation axis Ax of the rotor 3, as illustrated in FIG. 9. The straight line L4 is a straight line passing through a contact point C2 and a center C1 of the winding 26, in the plane perpendicular to the rotation axis Ax of the rotor 3, as illustrated in FIG. 9. The center C1 of the winding 26 is the center of the winding 26 abutting against the second portion 222, in the plane perpendicular to the rotation axis Ax of the rotor 3. The contact point C2 is the contact point between the second portion 222 and the winding 26 abutting against the second portion 222, in the plane perpendicular to the rotation axis Ax of the rotor 3.

In the example illustrated in FIGS. 8 and 9, the relationship between the maximum thickness t2 of the first portion 221 and the minimum thickness t1 of the second portion 222 satisfies t2>t1.

Figure 10:
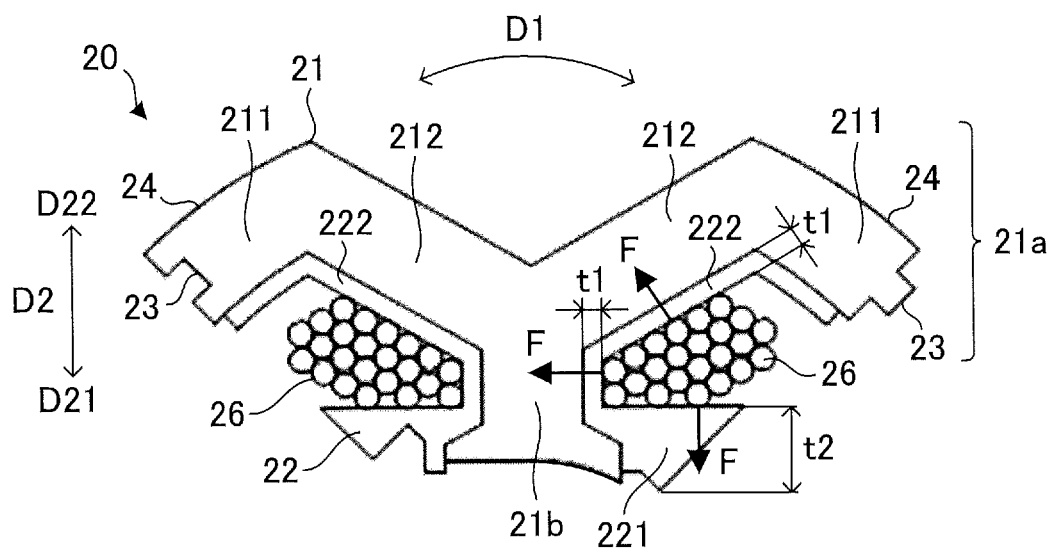
FIG. 10 is a diagram illustrating a stress occurring on the insulator due to winding of a winding.

FIG. 10 is a diagram illustrating a stress F occurring on the insulator 22 due to winding of the winding 26.

When the stator 2 satisfies t2>t1, the rigidity of portions of the insulator 22 that are not supported by the stator core 21, that is, the first portions 221 of the insulator 22 can be maintained similarly to the second portions 222 of the insulator 22. In other words, when the stator 2 satisfies t2>t1, the rigidity against the stress F occurring on the first portions 221 due to winding of the winding 26 can be enhanced. This makes it possible to prevent deformation of the first portions 221 of the insulator 22.

Although FIGS. 8 to 10 each illustrate only the relationship between the maximum thickness t2 and the minimum thickness t1 of the second portion 222 in the insulator 22 disposed on the right side of the tooth 21b, the insulator 22 disposed on the left side of the tooth 21b may even hold the relationship between the maximum thickness t2 and the minimum thickness t1 of the second portion 222 in the insulator 22 lying on the right side, that is, t2>t1. In this case, the insulator 22 lying on the left side also has the effects of the above-mentioned insulator 22 lying on the right side.

Figure 11:
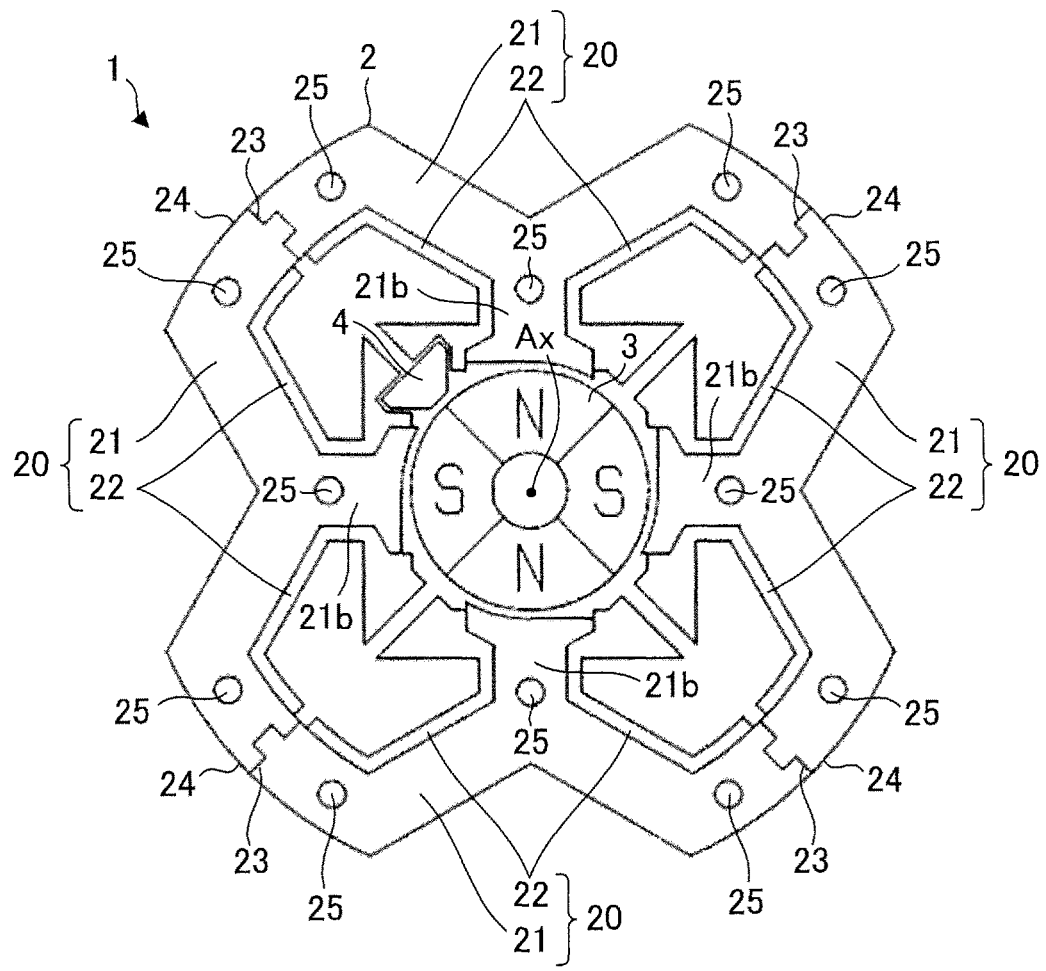
FIG. 11 is a plan view schematically illustrating a structure of an electric motor including a stator fixed by caulking.

FIG. 11 is a plan view schematically illustrating a structure of the electric motor 1 including the stator 2 fixed by caulking.

Figure 12:
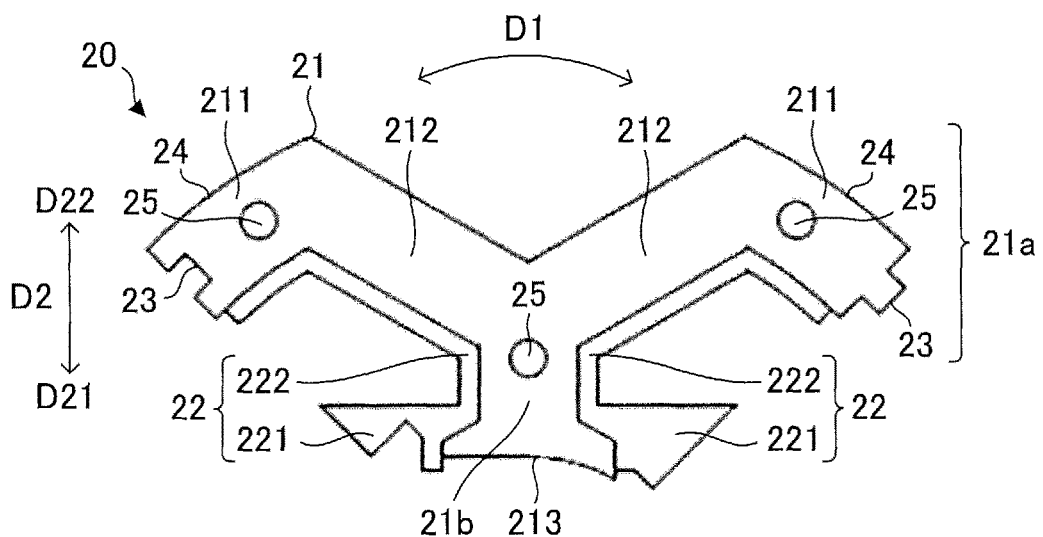
FIG. 12 is a plan view schematically illustrating a structure of a split core including a stator core fixed by caulking.

FIG. 12 is a plan view schematically illustrating a structure of the split core 20 including the stator core 21 fixed by caulking.

Caulked parts 25 illustrated in FIGS. 11 and 12 are portions fixed by caulking.

A plurality of amorphous metals or a plurality of electrical steel sheets forming the stator cores 21 may be fixed by caulking in the caulked parts 25, as illustrated in FIGS. 11 and 12. In the electric motor 1 illustrated in FIG. 11 and the split core 20 illustrated in FIG. 12, structures other than the caulked parts 25 are the same as those of the electric motor 1 and the split core 20, respectively, illustrated in FIGS. 1 to 10.

The use of caulking makes it possible to stabilize the shapes of the stator cores 21 and, in turn, to stabilize the shapes of the split faces 23. Accordingly, when, for example, the frame 5 (FIG. 13) is fitted to the electric motor 1 by shrink fitting, the split cores 20 can be prevented from coming apart at the split faces 23.

Figure 13:
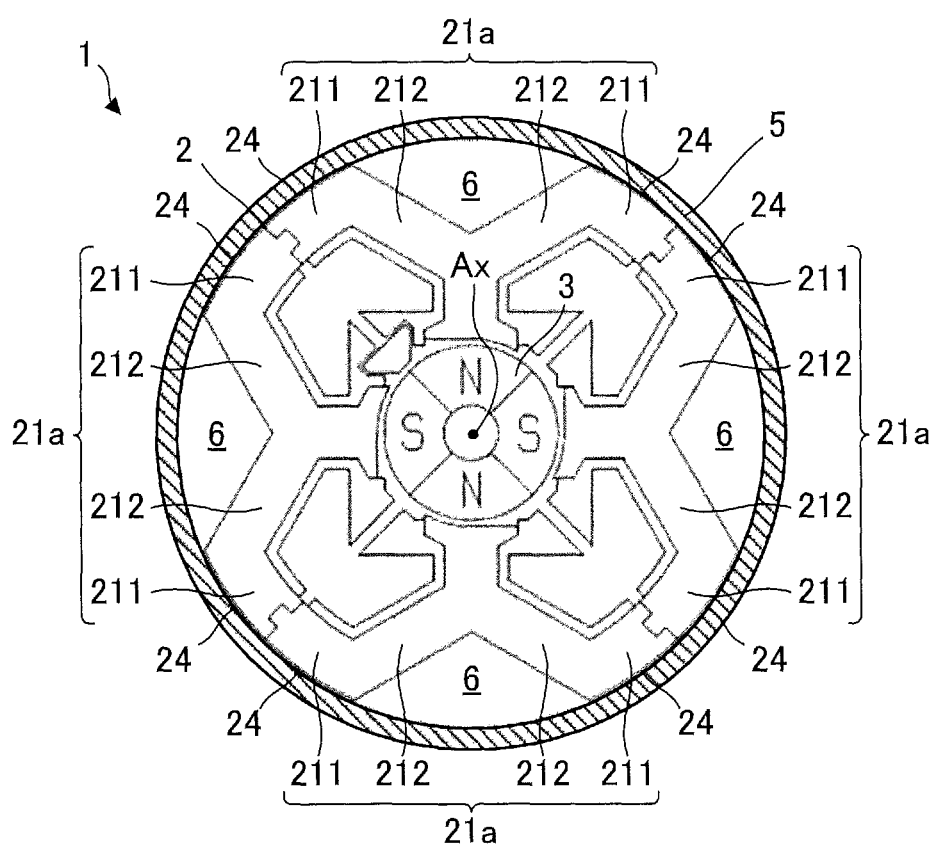
FIG. 13 is a plan view illustrating a structure of the electric motor further including a frame.

FIG. 13 is a plan view illustrating a structure of the electric motor 1 further including the frame 5. In FIG. 13, the frame 5 is illustrated in the shape of a cross-section in a plane perpendicular to the rotation axis Ax of the rotor 3.

The frame 5 covers the stator 2 of the electric motor 1. The frame 5 has, for example, a cylindrical shape. Contact portions in contact with the inner peripheral surface of the frame 5 are outer peripheral surfaces 24 of the yokes 21*a* (more specifically, the back yokes 211) formed in arc shapes. The outer peripheral surfaces 24 are formed in arc shapes, and are therefore in contact with the frame 5 by surface contact. This makes it possible to obtain an advantage that fixing of the stator 2 is stabilized in the frame 5 and the shape of the stator 2 can easily be maintained.

Spaces 6 exist between the yokes 21*a* and the frame 5. More specifically, the spaces 6 exist between the frame 5 and the joint parts 212 of the yokes 21*a*. This makes it possible to easily dissipate heat generated by the electric motor 1 from the spaces 6 to the exterior of the electric motor 1. As a result, a rise in temperature of the electric motor 1 can be reduced, and the efficiency of the electric motor 1 can thus be improved.

Figure 14:
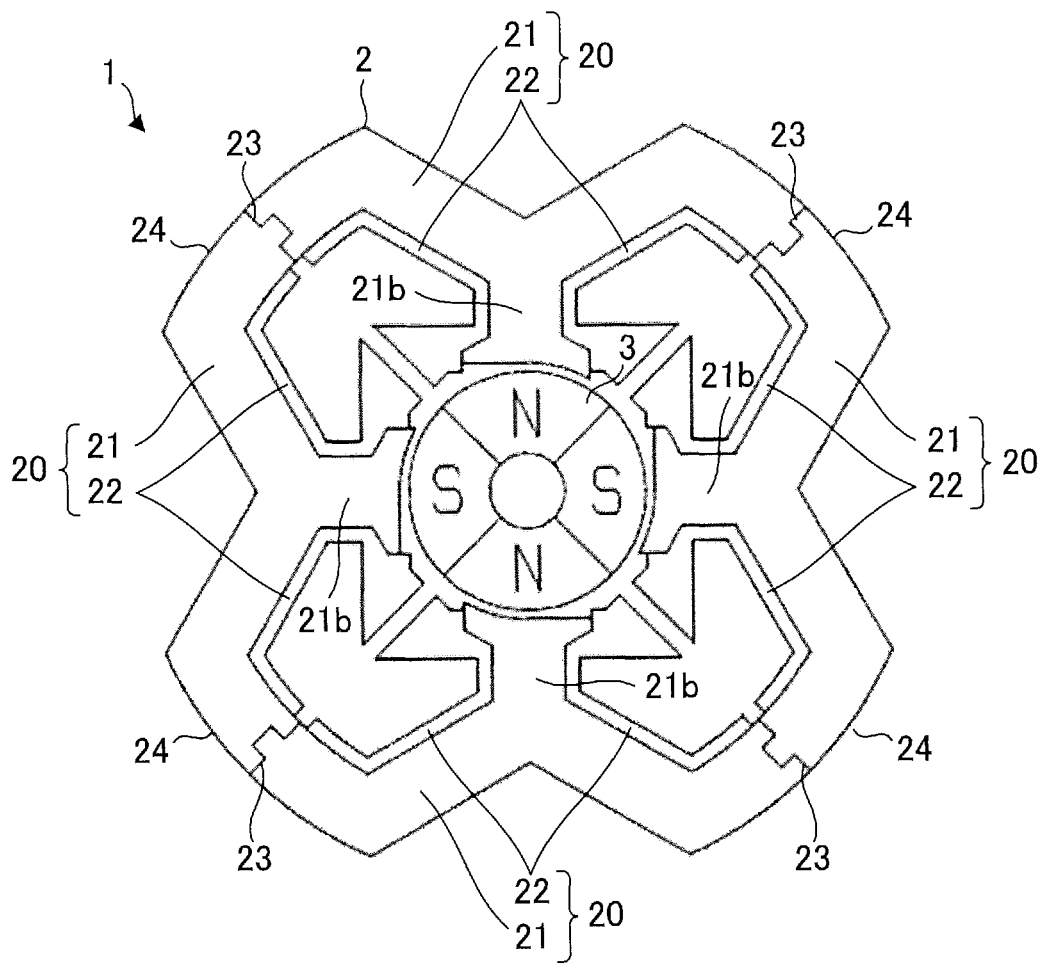
FIG. 14 is a plan view illustrating another example of the electric motor.

FIG. 14 is a plan view illustrating another example of the electric motor 1.

The electric motor 1 illustrated in FIG. 14 includes no position sensor 4. In other words, even in the electric motor 1 including no position sensor 4, the structure of the above-mentioned electric motor 1 can be employed, and then the same effects as those of the electric motor 1 illustrated in FIG. 1 are exhibited. Moreover, when no position sensor 4 is used, in each split core 20, the maximum thickness t2 of each of the pair of first portions 221 of the insulator 22 can be set larger, and therefore the rigidity of both of the pair of first portions 221 against the stress F of the winding 26 can further be enhanced.

The effects of the electric motor 1 according to the Embodiment will further be described below.

Figure 15:
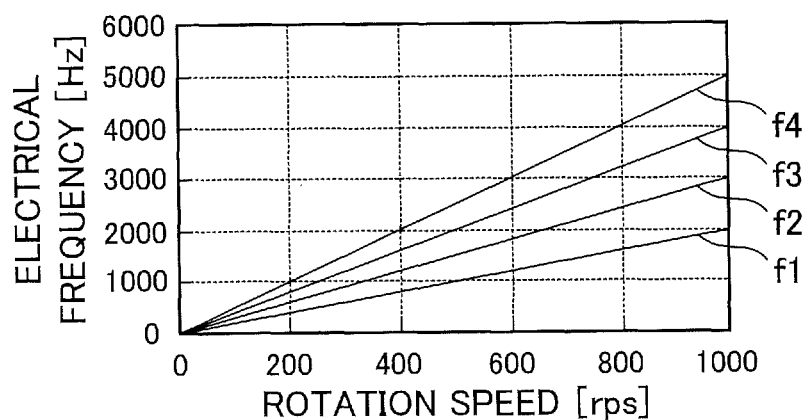
FIG. 15 is a diagram representing a relationship between the rotation speed (rps) of an electric motor and the electrical frequency (Hz) of a current input to the electric motor, for each magnetic pole count of a rotor.

FIG. 15 is a diagram representing a relationship between the rotation speed (rps) of an electric motor and the electrical frequency (Hz) of a current input to the electric motor, for each magnetic pole count of a rotor. More specifically, FIG. 15 is a graph representing the relationship between the rotation speed of an electric motor and the electrical frequency when the number of magnetic poles of the electric motor is changed. Referring to FIG. 15, f1 indicates the relationship between the rotation speed and the electrical frequency in the electric motor 1 according to this Embodiment. f2 indicates the relationship between the rotation speed and the electrical frequency in an electric motor having six magnetic poles and six teeth. f3 indicates the relationship between the rotation speed and the electrical frequency in an electric motor having eight magnetic poles and eight teeth. f4 indicates the relationship between the rotation speed and the electrical frequency in an electric motor having 10 magnetic poles and 10 teeth.

Figure 16:
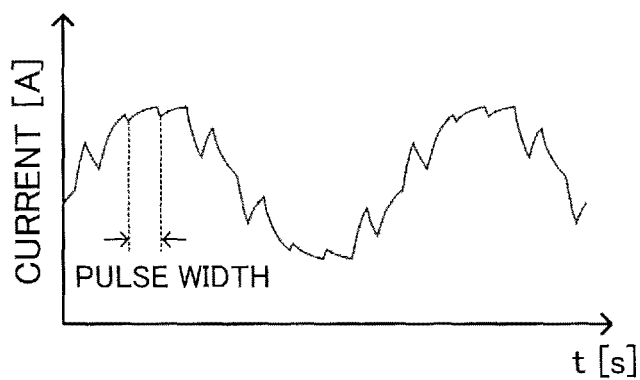
FIG. 16 is a diagram illustrating a waveform of a current input to the electric motor according to Embodiment 1.

FIG. 16 is a diagram illustrating a waveform of a current input to the electric motor 1 according to Embodiment 1.

Figure 17:
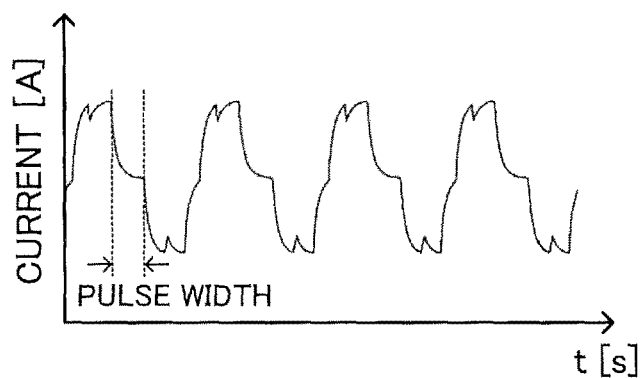
FIG. 17 is a diagram illustrating a waveform of a current input to an electric motor having eight magnetic poles according to a Comparative Example.

FIG. 17 is a diagram illustrating a waveform of a current input to an electric motor having eight magnetic poles according to a Comparative Example. The waveforms illustrated in FIGS. 16 and 17 are the waveforms of currents input to the electric motor 1 during one rotation of the rotor 3, and the carrier frequencies of these waveforms are equal to each other.

The electrical frequency of the current input to the electric motor increases with increasing the number of magnetic poles, as illustrated in FIG. 15. For example, by comparison with the case that the number of magnetic poles is four, in the case that the number of magnetic poles is eight, the electrical frequency doubles at a rotation speed of 1,000 rps. Accordingly, as illustrated in FIG. 17, when the carrier frequency is kept constant, the waveform of a current input to an electric motor having eight magnetic poles is rougher than in the electric motor 1 (FIG. 16) having four magnetic poles. The rougher the waveform of the current, the poorer the controllability (for example, the control of rotation of a rotor) of the electric motor. Therefore, to drive the electric motor at a high speed of 10,000 rpm or more, for example, it is desired to use as few magnetic poles as possible, and lower the electrical frequency. This improves the controllability of the electric motor.

As described above, to improve the controllability of the electric motor 1, in the electric motor 1 according to this Embodiment, the rotor 3 has four magnetic poles, and the stator 2 includes four teeth 21*b*. This makes it possible to enhance the controllability even when the electric motor is driven at a speed of 10,000 rpm or more, compared with an electric motor having six or more magnetic poles.

When the electric motor 1 is driven by a single-phase inverter, the number of switching operations can be reduced, and the switching loss in high-speed rotation can be reduced, compared, for example, to driving by a three-phase inverter.

Each yoke 21*a* is formed by the back yokes 211 and the joint parts 212. Each joint part 212 has a length from the tooth 21*b* toward the outer side in the radial direction, and each back yoke 211 has a length from the corresponding joint part 212 toward the inner side in the radial direction. This makes it possible to widen a region of a stator coil formed by the winding 26.

Figure 18:
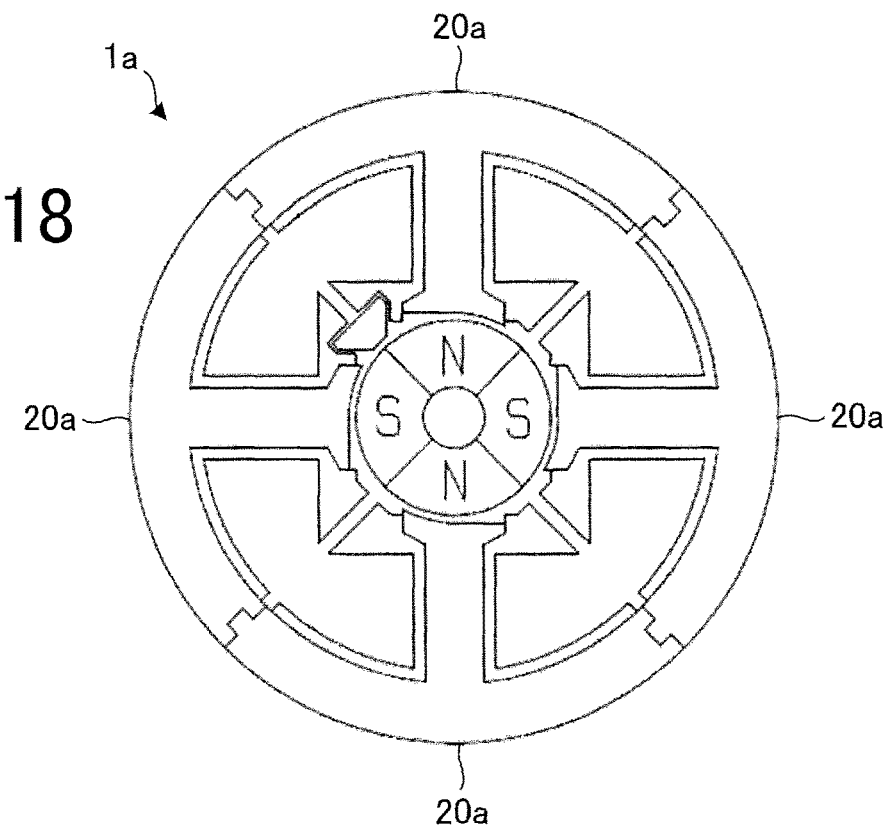
FIG. 18 is a plan view schematically illustrating a structure of an electric motor according to Comparative Example 1.

FIG. 18 is a plan view schematically illustrating a structure of an electric motor 1*a* according to Comparative Example 1.

Figure 19:
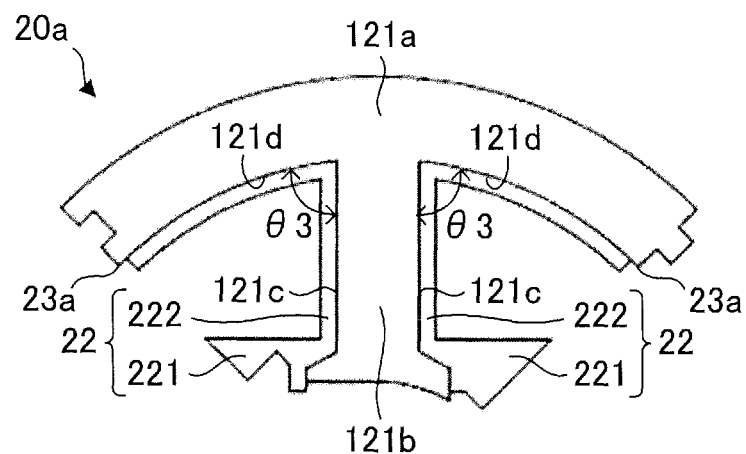
FIG. 19 is a plan view schematically illustrating a structure of a split core of the electric motor according to Comparative Example 1.

FIG. 19 is a plan view schematically illustrating a structure of a split core 20*a* of the electric motor 1*a* according to Comparative Example 1.

Figure 20:
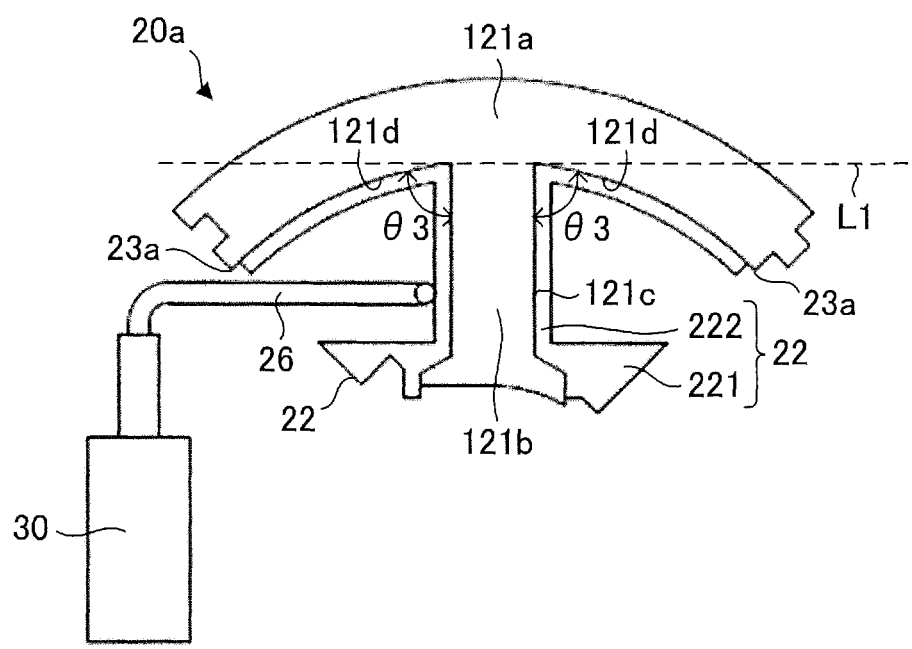
FIG. 20 is a diagram illustrating an example of a process of winding a winding on the split core of the electric motor according to Comparative Example 1.

FIG. 20 is a diagram illustrating an example of a process of winding a winding 26 on the split core 20*a*.

The electric motor 1*a* according to Comparative Example 1 has four magnetic poles and includes four teeth 121*b*, like the electric motor 1 according to this Embodiment. The electric motor 1*a* includes four split cores 20*a*. The teeth 121*b* correspond to the teeth 21*b* of the electric motor 1, and have the same structure as the teeth 21*b*. In the electric motor 1*a*, the structure of a yoke 121*a* is different from that of the yoke 21*a* of the electric motor 1 according to this Embodiment. More specifically, the maximum angle θ3 formed by each side surface 121*c* of the tooth 121*b* and a corresponding side surface 121*d* of the yoke 121*a* on the inner side in the radial direction is smaller than 90 degrees.

Windings are wound around teeth, normally using a nozzle. When a stator is not divided into a plurality of cores, since the nozzle needs to be inserted into a slot between teeth, it is difficult to wind the windings to achieve high density of stator coils. On the other hand, in this Embodiment, since the stator 2 is divided into a plurality of cores, the winding 26 can easily be wound around each tooth 21*b* using a nozzle, and the density of stator coils can thus be increased. Note, however, that to prevent a positional shift of the position sensor 4, the winding 26 is desirably not wound near the position sensor 4.

However, in the electric motor 1*a* illustrated in FIGS. 18 and 19, since the maximum angle θ3 is smaller than 90 degrees, split end portions 23*a* are located inside the straight line L1 in the radial direction, as illustrated in FIG. 20. With this arrangement, the yoke 121*a* hampers the operation of a nozzle 30, and it is difficult to wind the winding 26 especially around the outer portions of the tooth 121*b* in the radial direction. In contrast to this, in the electric motor 1 according to this Embodiment, the angle θ1 (degrees) satisfies 90 degrees<θ1<180 degrees. Accordingly, with the electric motor 1 according to this Embodiment, it is possible to obtain an advantage that the split core 20 can be formed so that the split end portions 23a are located outside the straight line L1 in the radial direction and thus winding of the winding 26 is facilitated.

Figure 21:
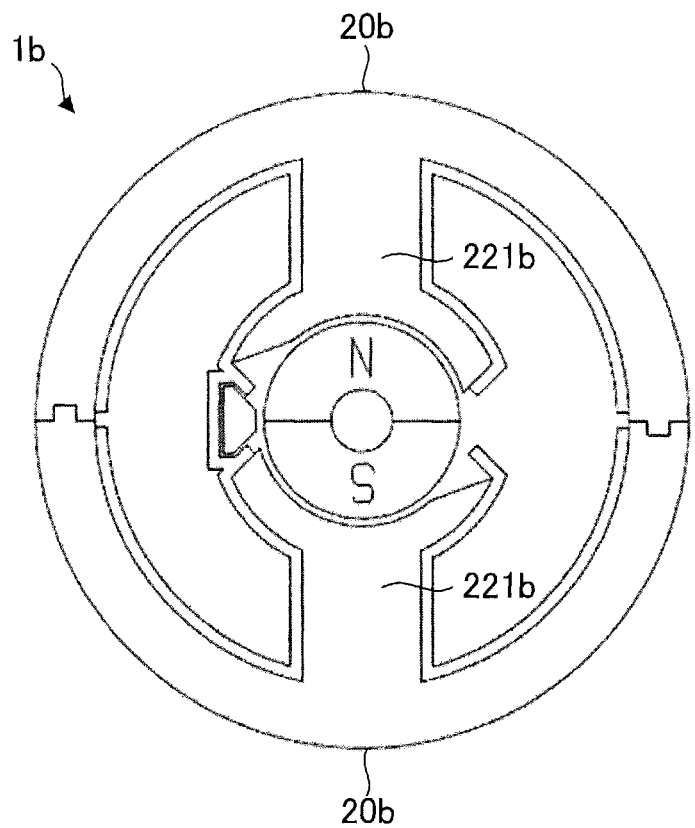
FIG. 21 is a plan view schematically illustrating a structure of an electric motor according to Comparative Example 2.

FIG. 21 is a plan view schematically illustrating a structure of an electric motor 1b according to Comparative Example 2.

Figure 22:
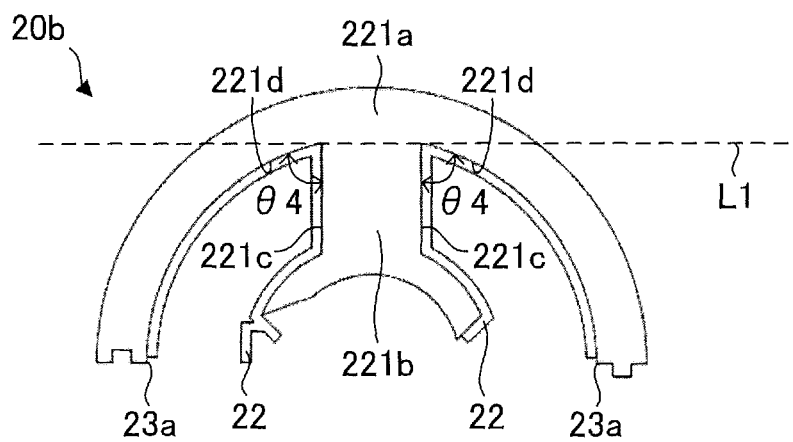
FIG. 22 is a plan view schematically illustrating a structure of a split core of the electric motor according to Comparative Example 2.

FIG. 22 is a plan view schematically illustrating a structure of a split core 20b of the electric motor 1b according to Comparative Example 2.

The electric motor 1b according to Comparative Example 2 has two magnetic poles and includes two teeth 221b. The electric motor 1b includes two split cores 20b. In the electric motor 1b, the structure of a yoke 221a is different from that of the yoke 21a of the electric motor 1 according to this Embodiment. More specifically, the maximum angle θ4 formed by a side surface 221c of the tooth 221b and a corresponding side surface 221d of the yoke 221a on the inner side in the radial direction is smaller than 90 degrees.

As in the electric motor 1a according to Comparative Example 1, therefore, since the maximum angle θ4 is smaller than 90 degrees also in the electric motor 1b, the yoke 221a hampers the operation of a nozzle 30 in winding of a winding, and it is difficult to wind the winding especially around the outer portions of the tooth 221b in the radial direction.

As described above with reference to FIG. 15, the number of magnetic poles and the number of teeth are desirably small in consideration of the controllability of the electric motor 1, while the number of magnetic poles is desirably four and the number of teeth is desirably four in consideration of winding of windings. Even if the number of magnetic poles is four and the number of teeth is four, when, as in the electric motor 1a according to Comparative Example 1, the maximum angle θ3 is smaller than 90 degrees, it is difficult to wind the windings 26.

Accordingly, in this Embodiment, the electric motor 1 has four magnetic poles and includes four teeth 21b, and the angle θ1 (degrees) satisfies 90 degrees<θ1<180 degrees. This makes it possible to enhance the controllability of the electric motor 1, to obtain an advantage that winding of the windings 26 is facilitated, and thus to increase the density of stator coils.

In this Embodiment, each joint part 212 has a length from the tooth 21b toward the outer side in the radial direction, and each back yoke 211 has a length from the corresponding joint part 212 toward the inner side in the radial direction. Accordingly, as illustrated in FIG. 6, since the split core 20 can be formed so that the split end portions 23a are located outside the straight line L1 in the radial direction, winding of the winding 26 can be facilitated.

The stator 2 satisfies α2>α1, as illustrated in FIG. 7. In other words, the first portions 221 of the insulator 22 extend in a direction perpendicular to the radial direction in a plane perpendicular to the rotation axis Ax of the rotor 3. This makes it possible to support the winding 26 by the first portions 221 of the insulator 22, and to prevent the winding 26 from coming apart.

The number of turns of the winding 26 can be increased by forming the first portions 221 to be long in a direction perpendicular to the radial direction. However, the longer the first portions 221 in the direction perpendicular to the radial direction, the lower the rigidity against the stress F occurring on the first portions 221 due to winding of the winding 26.

As illustrated in FIGS. 8 to 10, when the relationship between the maximum thickness t2 of the first portion 221 and the minimum thickness t1 of the second portion 222 satisfies t2>t1, the rigidity against the stress F occurring due to winding of the winding 26 can be enhanced. This makes it possible to prevent deformation of portions of the insulator 22 that are not supported by the stator core 21, that is, the first portions 221 of the insulator 22.

The position sensor 4 is fixed by the insulators 22 between two teeth 21b adjacent to each other. This makes it possible to downsize the electric motor 1.

Figure 23:
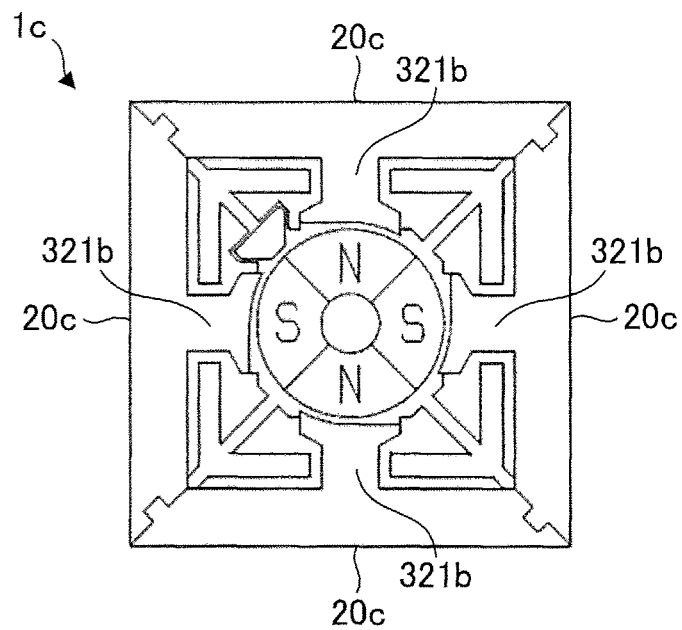
FIG. 23 is a plan view schematically illustrating a structure of an electric motor according to Comparative Example 3.

FIG. 23 is a plan view schematically illustrating a structure of an electric motor 1c according to Comparative Example 3.

Figure 24:
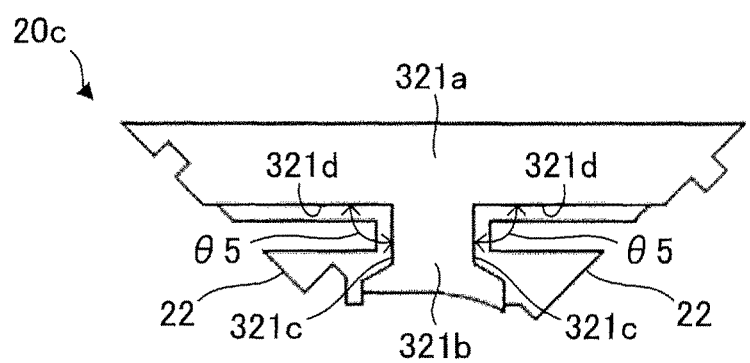
FIG. 24 is a plan view schematically illustrating a structure of a split core of the electric motor according to Comparative Example 3.

FIG. 24 is a plan view schematically illustrating a structure of a split core 20c of the electric motor 1c according to Comparative Example 3.

The electric motor 1c according to Comparative Example 3 has four magnetic poles and includes four teeth 321b, like the electric motor 1 according to this Embodiment. The electric motor 1c includes four split cores 20c. In the electric motor 1c, the structure of a yoke 321a is different from that of the yoke 21a of the electric motor 1 according to this Embodiment. More specifically, the yoke 321a is formed in a straight line along a direction perpendicular to the radial direction. In the electric motor 1c, the angle θ5 formed by a side surface 321c of the tooth 321b and a corresponding side surface 321d of the yoke 321a on the inner side in the radial direction is 90 degrees. It is, therefore, possible to enhance the controllability of the electric motor 1c, to facilitate winding of a winding, and thus to obtain an advantage that the density of the winding is increased, as in the electric motor 1 according to the above-described Embodiment.

Figure 25:
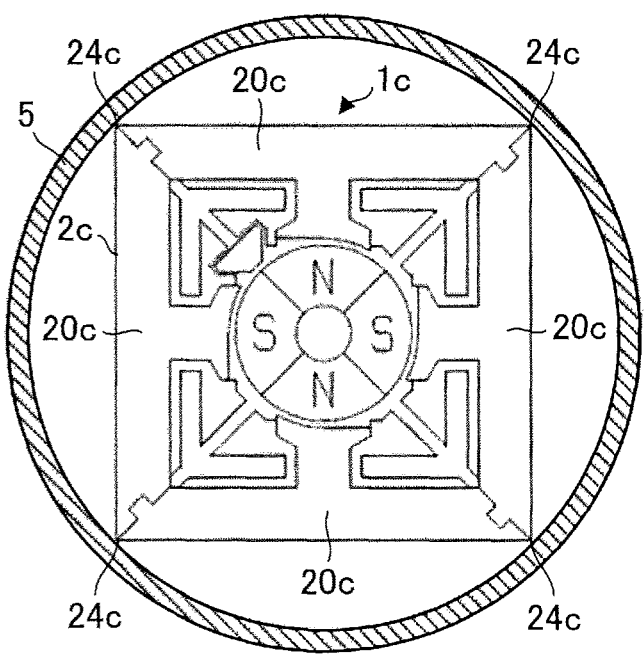
FIG. 25 is a plan view illustrating an electric motor according to Comparative Example 3 disposed in a frame.

FIG. 25 is a plan view illustrating the electric motor 1c according to Comparative Example 3 disposed in a frame 5.

The frame 5 is a cylindrical frame. As illustrated in FIG. 25, in the electric motor 1c, when contact portions 24c in contact with the inner peripheral surface of the frame 5 are in contact with the frame 5 by point contact, the stator 2c (that is, the four split cores 20c) is not stably fixed in the frame 5 and it is difficult to maintain the shape of the stator 2c.

As illustrated in FIG. 13, in the electric motor 1 according to the above-described Embodiment, the contact portions in contact with the inner peripheral surface of the frame 5 are the outer peripheral surfaces 24 of the yokes 21a (more specifically, the back yokes 211) formed in arc shapes. The outer peripheral surfaces 24 are formed in arc shapes in a plane perpendicular to the rotation axis Ax of the rotor 3, and are therefore in contact with the frame 5 by surface contact. This makes it possible to obtain an advantage that fixing of the stator 2 is stabilized in the frame 5 and thus the shape of the stator 2 can easily be maintained.

In a plane perpendicular to the rotation axis Ax of the rotor 3, the tooth 21b and the pair of joint parts 212 form a Y shape. This makes it possible to reduce the material of the stator core 21. Furthermore, since the surface area of the stator core 21 and, more specifically, that of the yoke 21a can be increased, heat generated by the electric motor 1 can be efficiently dissipated outside the electric motor 1.

As illustrated in FIG. 13, when the stator 2 is fixed in the frame 5, the spaces 6 exist between the yokes 21a and the frame 5. This makes it possible to easily dissipate heat generated by the electric motor 1 from the spaces 6 to the exterior of the electric motor 1. As a result, a rise in temperature of the electric motor 1 can be reduced, and the efficiency of the electric motor 1 can thus be improved.

Embodiment 2

Figure 26:
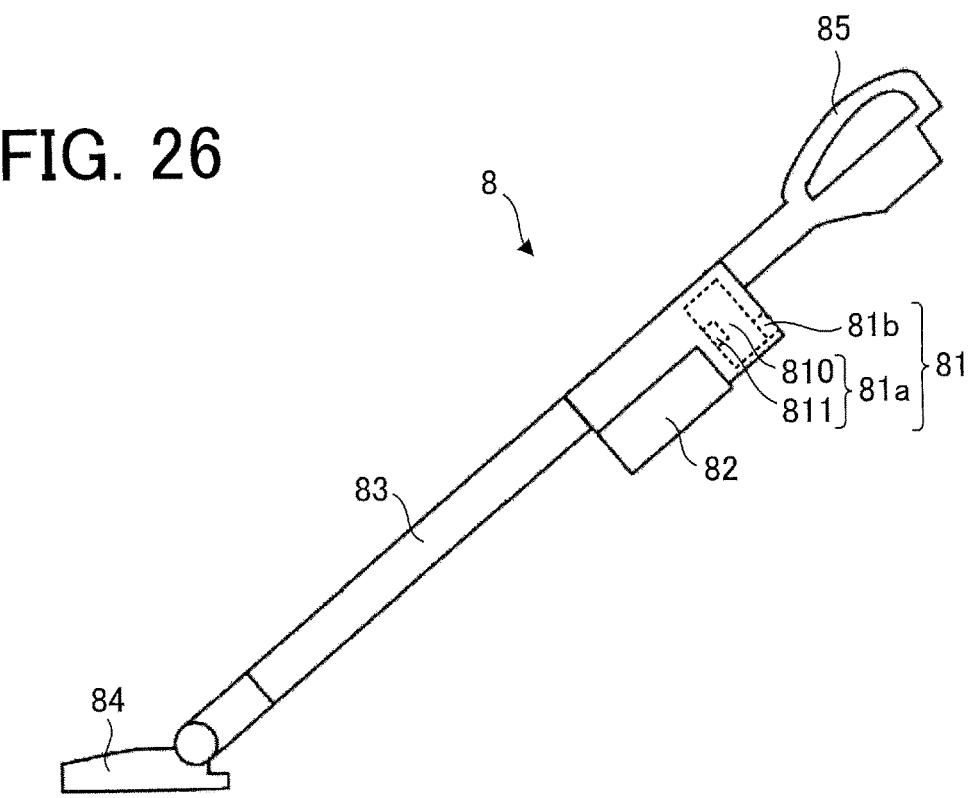
FIG. 26 is a side view schematically illustrating a vacuum cleaner according to Embodiment 2 of the present invention.

FIG. 26 is a side view schematically illustrating a vacuum cleaner 8 (also simply called a "cleaner") according to Embodiment 2 of the present invention.

The vacuum cleaner 8 includes a main body 81, a dust collection part 82 (also called a dust collector), a duct 83, a suction nozzle 84, and a gripping portion 85.

The main body 81 includes an electric blower 81a to generate suction force (more specifically, an air current), and an exhaust port 81b.

The electric blower 81a includes a fan 811, and an electric motor 810 to rotate the fan 811. The electric motor 810 is identical to the electric motor 1 according to Embodiment 1 (including the modifications). When the electric motor 810 is driven, the fan 811 rotates to generate an air current. The fan 811 includes, for example, blades and a shaft fixed to the blades, and the shaft is fixed to the electric motor 810. The electric blower 81a sends dust to the dust collection part 82 using suction force generated by driving the electric motor 810.

The dust collection part 82 is mounted on the main body 81. However, the dust collection part 82 may be provided inside the main body 81. The dust collection part 82 is, for example, a container including a filter to separate dust and air. The suction nozzle 84 is mounted at the end of the duct 83.

When the vacuum cleaner 8 is powered on, power is supplied to the electric blower 81a and thus the electric blower 81a is driven. During driving of the electric blower 81a, dust is sucked in through the suction nozzle 84 by suction force generated by the electric blower 81a. Air currents generated by rotation of the fan 811 are combined together in the suction nozzle 84 and the duct 83. The dust sucked in through the suction nozzle 84 passes through the duct 83 and is collected in the dust collection part 82. The air sucked in through the suction nozzle 84 passes through the electric blower 81a and is exhausted outside the vacuum cleaner 8 through the exhaust port 81b.

The vacuum cleaner 8 according to Embodiment 2 includes the electric motor 1 described in Embodiment 1 (including the modifications), and therefore has the same effects as those described in Embodiment 1.

With the vacuum cleaner 8 according to Embodiment 2, the controllability (for example, the accuracy of the control of rotation of a rotor) of the electric motor 810 can be enhanced, and the controllability (for example, the accuracy of suction control) of the vacuum cleaner 8 can thus be improved.

Embodiment 3

Figure 27:
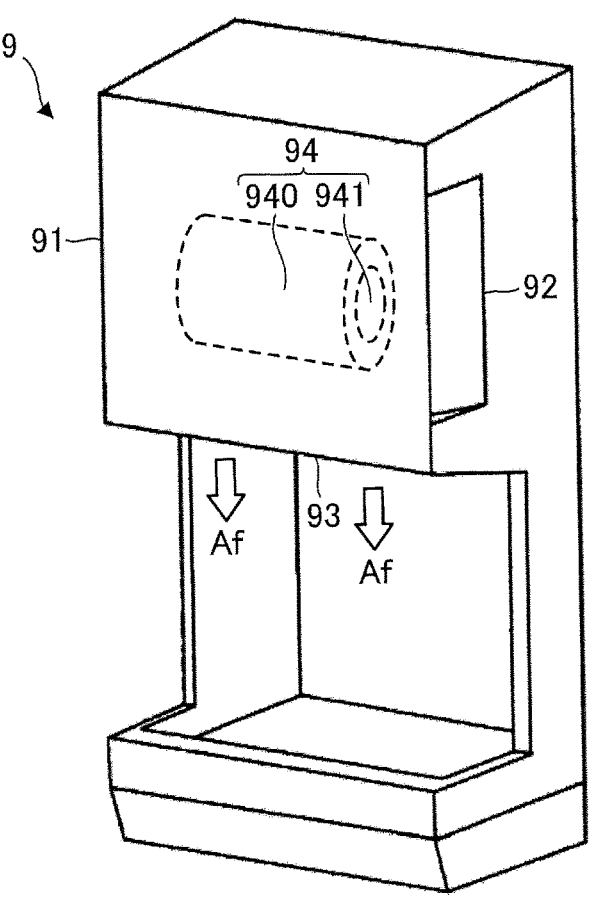
FIG. 27 is a perspective view schematically illustrating a hand dryer as a hand drying device according to Embodiment 3 of the present invention.

FIG. 27 is a perspective view schematically illustrating a hand dryer 9 as a hand drying device according to Embodiment 3 of the present invention.

The hand dryer 9 serving as a hand drying device includes a housing 91 and an electric blower 94. The housing 91 includes at least one air inlet 92 and at least one air outlet 93. The electric blower 94 is fixed in the housing 91.

The electric blower 94 includes a fan 941, and an electric motor 940 to rotate the fan 941. The electric motor 940 is the electric motor 1 according to Embodiment 1 (including the modifications). When the electric motor 940 is driven, the fan 941 rotates to generate an air current. The fan 941 includes, for example, blades and a shaft fixed to the blades, and the shaft is fixed to the electric motor 940. The electric blower 94 performs air suction and blowing by generating an air current. More specifically, the electric blower 94 sucks in air exterior to the housing 91 through the air inlet 92 and sends the air outside the housing 91 through the air outlet 93.

When the hand dryer 9 is powered on, power is supplied to the electric blower 94 and thus the electric blower 94 is driven. During driving of the electric blower 94, air exterior to the hand dryer 9 is sucked in through the air inlet 92. The air sucked in through the air inlet 92 passes through the inside of the electric blower 94 and is discharged through the air outlet 93.

In this Embodiment, the hand dryer 9 can exhaust two air currents Af through the air outlet 93. Note, however, that the two air currents Af generated by the electric blower 94 may be combined into one air current. In this case, one combined air current is exhausted through the air outlet 93.

By placing hands close to the air outlet 93, the user of the hand drier 9 can blow off waterdrops adhering to the hands and dry the hands.

The hand dryer 9 according to Embodiment 3 includes the electric motor 1 described in Embodiment 1 (including the modifications), and therefore has the same effects as those described in Embodiment 1.

With the hand dryer 9 according to Embodiment 3, the controllability (for example, the accuracy of the control of rotation of a rotor) of the electric motor 940 can be enhanced, and the controllability (for example, the accuracy of air blowing control) of the hand dryer 9 can thus be improved.

The features in the above-described Embodiments (including the modifications and the Comparative Examples) can be combined together as appropriate.

What is claimed is:

1. A stator disposed outside a rotor of an electric motor, the stator comprising:
    four split cores arranged in a circumferential direction about a rotation axis of the rotor,
    the split cores each including a stator core,
    the stator core including
    a tooth, and
    a yoke including a pair of joint parts each having a length from the tooth toward an outer side in a radial direction of the stator,
    wherein each joint part includes two side surfaces that are parallel to each other on opposite sides of each joint part,
    wherein in a plane perpendicular to the rotation axis of the rotor, a shape of an end of the tooth on an inner side of the end in the radial direction is asymmetrical,
    the shape of the end of the tooth differs between left and right sides of the end with respect to a straight line passing through, in the radial direction, a center of the stator core in the plane, the left side of the end being an upstream side of the end which is in a rotation direction of the rotor, the right side of the end being a downstream side of the end which is opposite to the rotation direction,
    an angle $\theta1$ (degrees) formed by a side surface of the tooth and a side surface of the yoke on an inner side of the yoke in the radial direction of the stator satisfies:
    90 degrees<$\theta1$<180 degrees, and
    a first air gap between the tooth on the upstream side of the end and the rotor is larger than a second air gap between the tooth on the downstream side of the end and the rotor.

2. The stator according to claim 1, further comprising:
an insulator insulating the tooth; and
at least one winding wound around the insulator, wherein the insulator including
- a pair of first portions disposed on both sides of the tooth and extending in a direction perpendicular to the radial direction in the plane, and
- a pair of second portions insulating the side surface of the yoke and the side surface of the tooth.

3. The stator according to claim 2, wherein
the stator satisfies $\alpha 2 > \alpha 1$
where $\alpha 1$ is an angle formed by two straight lines passing through the rotation axis and both ends of the end of the tooth in the direction perpendicular to the radial direction in the plane, and $\alpha 2$ is an angle formed by two straight lines passing through the rotation axis and both ends of the pair of first portions in the direction perpendicular to the radial direction in the plane.

4. The stator according to claim 1, further comprising:
an insulator insulating the tooth; and
at least one winding wound around the insulator, wherein the insulator including
- a first portion disposed on each of both sides of the tooth, and extending in a direction perpendicular to the radial direction in the plane, and
- a second portion insulating the side surface of the yoke and the side surface of the tooth, wherein the stator satisfies $t2 > t1$
where t1 is a minimum thickness of the second portion in a direction along a straight line passing through a center of the winding abutting against the second portion and a contact point between the second portion and the winding abutting against the second portion in the plane, and t2 is a maximum thickness of the first portion in a direction along a straight line passing through a center of the winding abutting against the first portion and a contact point between the first portion and the winding abutting against the first portion in the plane.

5. The stator according to claim 1, wherein the tooth and the pair of joint parts form a Y shape in the plane.

6. The stator according to claim 1, wherein the yoke includes a pair of back yokes each having a length from a corresponding one of the pair of joint parts toward an inner side in the radial direction.

7. The stator according to claim 2, further comprising a position sensor disposed adjacent to the tooth in the circumferential direction and to detect a magnetic field emanating from the rotor.

8. The stator according to claim 7, wherein the position sensor is fixed by the insulator.

9. An electric motor comprising the stator according to claim 1, and the rotor disposed inside the stator.

10. The electric motor according to claim 9, wherein the electric motor is driven by a single-phase inverter.

11. The electric motor according to claim 9, further comprising a frame covering the stator.

12. The electric motor according to claim 11, wherein a space exists between the yoke and the frame.

13. A vacuum cleaner comprising:
a dust collection part; and
an electric blower to generate suction force and send dust to the dust collection part,
the electric blower including
a fan, and
the electric motor according to claim 9 to rotate the fan.

14. A hand drying device comprising:
a housing including an air inlet and an air outlet; and
an electric blower fixed in the housing, the electric blower sucking in air exterior to the housing through the air inlet and sending the air outside the housing through the air outlet,
the electric blower including
a fan, and
the electric motor according to claim 9 to rotate the fan.

15. The stator according to claim 1, further comprising an insulator insulating the tooth and the yoke, wherein
an angle $\theta 2$ (degrees) formed by a side surface of the insulator fixed to the tooth and a side surface of the insulator fixed to the yoke in the plane satisfies:
90 degrees $< \theta 2 <$ 180 degrees.

* * * * *